United States Patent [19]

Zapf

[11] Patent Number: 5,054,563

[45] Date of Patent: Oct. 8, 1991

[54] ELECTRICAL HAND TOOL

[75] Inventor: Jürgen Zapf, Salmtal, Fed. Rep. of Germany

[73] Assignee: Proxxon Werkzeug GmbH, Niersbach, Fed. Rep. of Germany

[21] Appl. No.: 441,031

[22] Filed: Nov. 22, 1989

[30] Foreign Application Priority Data

Nov. 25, 1988 [DE] Fed. Rep. of Germany ....... 3839840

[51] Int. Cl.[5] .......................... H02K 7/14; B25G 1/00

[52] U.S. Cl. .................................. 173/163; 81/177.1; 310/50; 310/83

[58] Field of Search ......................... 173/163, 164, 48; 81/177.4, 180.1, 490; 310/50, 68 A, 83, 47; 320/2

[56] References Cited

U.S. PATENT DOCUMENTS

| | | | |
|---|---|---|---|
| 3,588,936 | 6/1971 | Duve | 310/50 X |
| 3,935,909 | 2/1976 | Mabuchi et al. | 310/50 X |
| 3,999,110 | 12/1976 | Ramstrom et al. | 310/50 X |
| 4,078,589 | 3/1978 | Miller | 310/50 X |
| 4,081,704 | 3/1978 | Vassos et al. | 173/163 X |
| 4,522,270 | 6/1985 | Kishi | 173/163 |
| 4,835,410 | 5/1989 | Bhagwat et al. | 310/50 X |

*Primary Examiner*—Mark Rosenbaum
*Assistant Examiner*—Rinaldi Rada
*Attorney, Agent, or Firm*—McGlew & Tuttle

[57] ABSTRACT

An electrical hand tool, powered by a battery, for use as a screwdriver or drill, is provided with a subcompartment 19 for the battery 20. The housing 1 consists of a drive compartment 2 and a handle component 3. In order to construct a compartment 18 for the battery 20 which is relatively large, without making the handle compartment 3 correspondingly long, a subcompartment 19 is provided in the drive component 2. The switch 8 is mounted on the drive component 2 between the subcompartment 19 and the tool receptacle 6.

14 Claims, 1 Drawing Sheet

ELECTRICAL HAND TOOL

FIELD OF THE INVENTION

The present invention pertains to an electrical hand tool, powered by at least one battery. The hand tool is for use as a screwdriver and/or drill, the housing of which consists of a drive component, on one side of which a motor and a gear box are mounted in a drive housing. A handle housing is provided defining a compartment for the battery or batteries, which joins the side of the drive housing opposite the chuck. The longitudinal axis of the two housing components are angled with respect to one another, and a switch is provided in the housing, the trigger of which is mounted within grasp of the handle component.

BACKGROUND OF THE INVENTION

Such hand tools are described in the journal test, 11/88, pp. 90-95 (or continuous page numbers 1106 to 1111). The motor is driven by the built-in battery. Thus, work is not encumbered by an electrical cord.

The output of such tools is limited by the electrical voltage of the battery used. In actual practice rated voltages of 4.8V to 9.6V are employed. High voltages are desirable to increase output. However, this results in the disadvantage that with higher voltages the batteries are correspondingly larger, so that the design of the tool becomes awkward.

Cylindrical batteries, oval in cross section, are used in conventional screwdrivers. Their length is dependent upon the rated voltage. The battery is inserted from below into the handle component. With batteries of higher rated value, the handle component is awkward in its length. In other screwdrivers the battery is shoved into the drive component from behind. Accordingly, the drive component is then of awkward length.

In other conventional power screwdrivers, block-shaped batteries are used, which are located in the lower part of the handle component and extend beyond it. This design, as well, appears to be awkward.

With conventional models, besides the battery, the switch, as well, is located in the handle component. Thereby, the space available to the battery in the handle component is limited.

In West German GM No. 85 05 814 such a screwdriver is described in which the battery and the switch are located in the handle component.

SUMMARY AND OBJECTS OF THE INVENTION

It is an object of the present invention is to provide a device of the type described initially, wherein the compartment for the battery is relatively large without the handle component being correspondingly long.

According to the present invention, the above goal is realized with a device of the type described initially by locating a subcompartment of the drive compartment defined by the drive housing along the side turned away from the chuck and placing the switch in the drive compartment between the subcompartment and the tool receptacle.

Because the switch is located in the drive compartment, the interior area of the drive compartment is completely available to the battery. The subcompartment located in the drive component extends the compartment beyond the handle component; thus, the handle component or handle housing is shorter than the handle compartment. Thus, a comparatively larger battery with correspondingly higher rated voltage can be inserted, whereby the design of the device is handy and compact.

A special advantage lies in the fact that the center of gravity of the battery is located in the hand holding the handle of the device. The weight of the battery, thus, hardly occasions pitching motions which would have to be balanced out by the hand operating it.

In the preferred embodiment of the present invention the trigger for the switch is located between the subcompartment and the chuck of the drive component. It, therefore requires no space in the handle component. The trigger can be operated easily with one finger of the hand which is holding the handle of the device.

Preferably the device is a screwdriver or a drill or a combination device, with which screws can be driven and also drilling can be done.

Accordingly, it is an object of the invention to provide an electric hand tool, powered by at least one battery, for use as a screwdriver and/or a drill. The electric hand tool arrangement includes a housing attached to a chuck, the housing defining a drive housing portion and a handle housing portion joining the side of the drive housing portion opposite the chuck. A motor and gear box ar mounted in the drive housing portion in the drive compartment. The drive housing portion and the handle housing portion are arranged each having longitudinal axes which are arranged at an angle with respect to one another. A switch is provided in the drive housing portion of the housing with a switch trigger mounted within the grasp of the handle housing portion. The drive housing portion further defining a subcompartment adjacent the drive compartment, located opposite the chuck. The switch is positioned in the drive housing portion mounted between the subcompartment and the chuck.

A further object of the invention is to provide a power tool which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
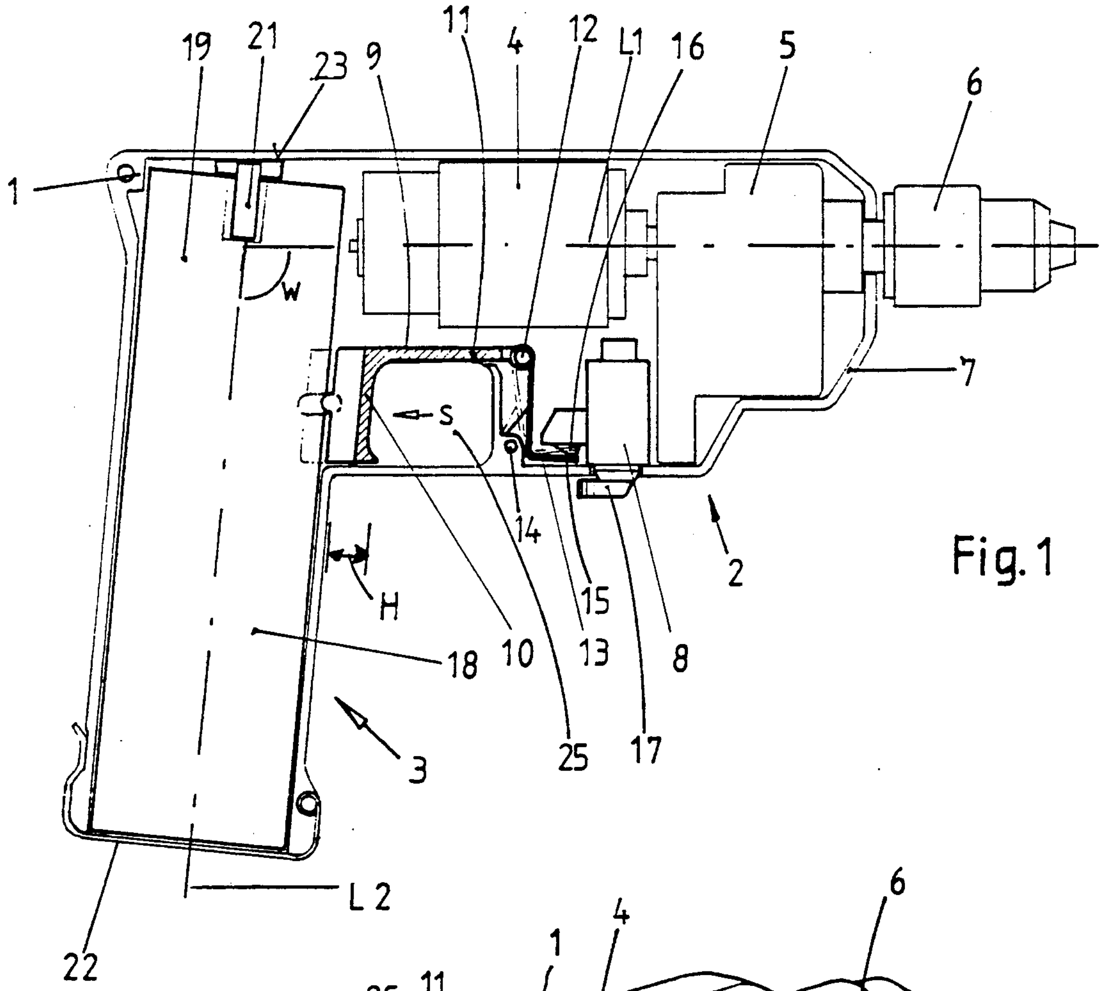
FIG. 1 is a side view of an open screwdriver with a casing half removed; and, FIG. 2 is a perspective view of the open screwdriver with a casing half removed.
Figure 2:
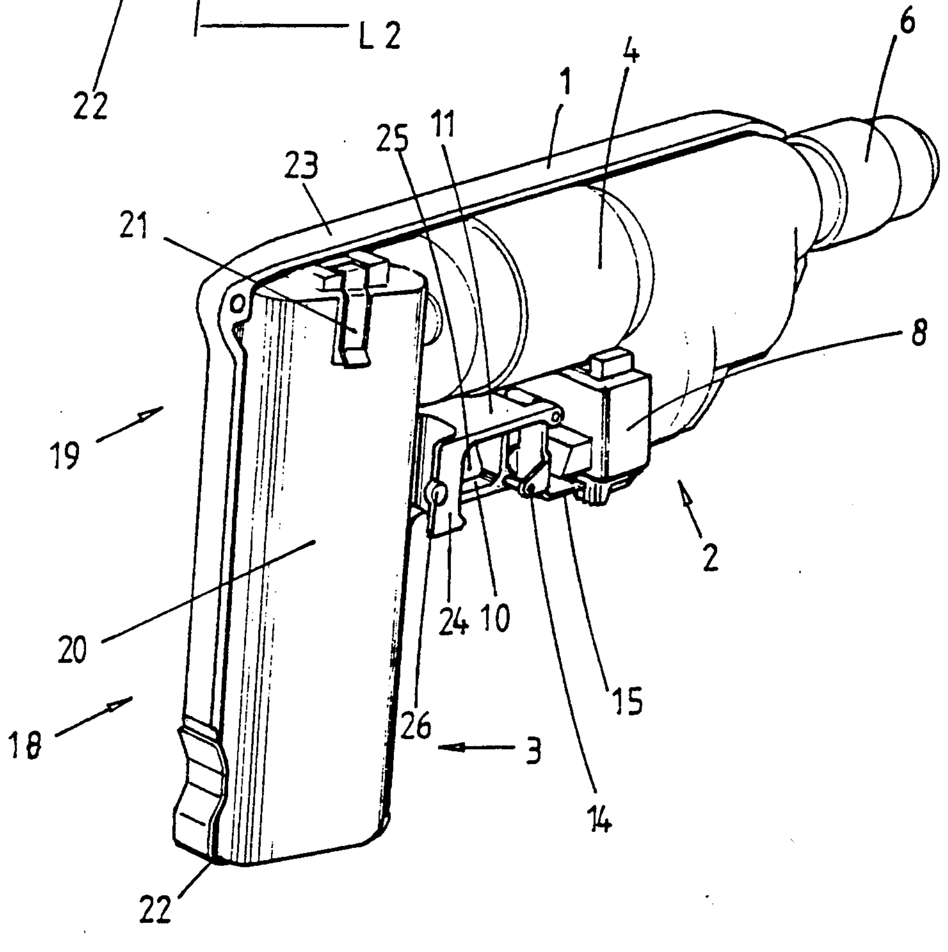

Referring to the drawings in particular, the device according to the invention has a housing 1, one half of which has been removed in the drawings according to FIGS. 1 and 2. The housing 1 consists of a drive housing component 2 and a handle housing component 3, the longitudinal axes of which L1, L2 are positioned at an obtuse angle (W) to each other.

The drive component 2 define a drive compartment in which an electric motor 4 and a gear box 5 connected to it are located. The gear box is linked to a chuck 6, which serves as a tool receptacle for drill bits or screw-driver blades. The chuck 6 extends beyond the drive component 2 at its front end 7.

Additionally, an automatic switch 8 with an electronic control circuit is mounted on the drive component 2 in the drive compartment. Also a trigger 9, which moves in the direction of the arrow S, is slide-mounted on the drive component 2. The trigger 9 is L-shaped. One end 10 of the trigger 9 is its actuating surface. The other end 11 of the trigger 9 engages the joint 12 of an angle plate 13, which is swivel-mounted on a pin 14. A free end 15 of the angle plate 13 is assigned to a stop 16 of switch 8. The switch 8 also has a reversing switch 17 to set the direction of the motor 4.

The interior of the handle component (3) is made up of a handle compartment 18, which lines up with a subcompartment 19, which is located facing the front side 7 of the drive component 2. The handle compartment 18 and the subcompartment 19 are available to receive a battery 20. In the upper subcompartment 19 in the drive housing component 2 there are positioned contact blades, by means of which the battery 20 is connected to the switch 8 and the motor 4. The battery 20 has a cylindrical form with an oval cross section. For example, eight cells are arranged in it in two rows, so that the battery, for example, has a rated voltage of 9.6V.

A flap 22 is affixed to the bottom of the handle component 3. Once it is opened, the battery 20 can be removed in the direction of its longitudinal axis L2 from the handle component 3 and replaced if needed. Instead of this, the flap 22 can also be affixed to the upper side 23 of the drive component 2. The battery 20 can then be inserted from above and can be removed in an upward direction. The contact blades 21, in this case, can be attached to the flap 22 or below, to the handle component 3. It is, however, also possible to construct the device so that the battery 20 is not replaceable.

The components: electrical motor 4, gear box 5, trigger 9 and switch 8 are located in the drive component 2 between the subcompartment 19 and the front side 7. This positioning does not limit the space in subcompartment 19, available for use in the drive compartment 2 to hold the battery 20, so that the subcompartment 19 thus extends to the upper side 23 of the drive housing component 2, i.e., it takes up the entire height of the drive component 2.

The end 10 of the trigger 9 which forms the actuating surface for one finger of the hand molding the tool is close to the handle component 3, so a finger of the hand holding the tool is close to the handle component 3. This allows the tool to readily be operated by the index finger of the hand holding the handle component 3 of the device. The end 10 is arched to reflect the oval form of the battery 20 (cf. FIG. 2). The end has no sharp edges for the index finger. The end 10 is provided with side flanks 24, which cover an Opening in the housing, not further illustrated, along the travel length of the trigger and enclose the battery 20 once the trigger 9 is actuated. The flanks 24 also serve to brace the trigger 9, because its end 10, in particular, is thin-walled. One result of this thinness is that the end 10 in its inoperative position (cf. FIGS. 1 and 2) can be readily lapped by the index finger, and its movement in the direction of the arrow (S) is not restricted by the battery.

Pins 26 on the flanks 24 engage grooves of the housing 1, not illustrated, and serve to guide the trigger 9 in the direction of the arrows S.

An aperture 25 has been formed for the index finger on the drive component 2, through which the end 10 is freely accessible. The aperture 25 is located near the battery 20. The switch 8 is mounted between the aperture 25 and the front side 7. In this embodiment the aperture 25 is closed at the bottom. It can also be left open at the bottom.

While a specific embodiment of the invention has been shown and described in detail to illustrate the application of the principles of the invention, it will be understood that the invention may be embodied otherwise without departing from such principles.

What is claimed is:

1. An electrical hand tool, powered by at least one battery for use as a screwdriver and/or drill, comprising:

a housing including a drive housing component and a handle housing component, said drive housing component defining a drive compartment and a drive housing subcompartment, said drive compartment being connected to a chuck at one end of said drive compartment, said handle housing component joining said drive housing component subcompartment at a location, said location being adjacent an end of said drive housing component, opposite said chuck, said handle housing component and said drive housing component each having longitudinal axes which are fixed, with respect to one another at an angle, a motor and a gear box being positioned in said drive compartment, a switch positioned in said drive housing component mounted between said subcompartment and the said chuck, a trigger connected to said switch and connected to said drive housing component and mounted within grasp of said handle housing component; said handle housing component defining a space in communication with said subcompartment, said at least one battery being positionable in said handle housing space extending into said subcompartment.

2. A hand tool according to claim 1, wherein said trigger is located between the subcompartment and the chuck.

3. A hand tool according to claim 2 wherein said trigger is located between the subcompartment and the switch.

4. A hand tool according to claim 1, wherein said trigger is L-shaped and slides along an exterior portion of the drive housing component, one end of said trigger forming an actuation surface being positioned adjacent said subcompartment, another end of said trigger being connected to said switch.

5. A hand tool according to claim 4, wherein said another end of said trigger engages a swivelling angle plate of said switch.

6. A hand tool according to claim 1, wherein said trigger is located in an aperture formed in said drive housing component.

7. A hand tool according to claim 1, wherein one of said subcompartment and said drive housing compartment of said drive housing component is disposed on an upper side of said drive housing component.

8. A hand tool according to claim 1, wherein a battery is provided with a longitudinal axis which lies parallel to the longitudinal axis of the handle component.

9. A hand tool according to claim 8, wherein the battery is accessible from a battery access means for providing access to the interior of said handle housing component provided in a lower end of the handle housing component.

10. An electrical hand tool, powered by at least one battery for use as a screwdriver and/or drill, comprising:

a housing including a drive housing component and a handle housing component, said drive housing component defining a drive compartment and a subcompartment, said drive compartment being connected to a chuck at one end of said drive compartment, said handle housing component joining said drive housing component subcompartment at a location, said location being adjacent an end of said drive housing component, opposite said chuck, said handle housing component and said drive housing component each having longitudinal axes which are fixed with respect to one another at an angle, a motor and a gear box positioned in said drive compartment, a switch positioned in said drive housing component mounted between said subcompartment and said chuck, a trigger connected to said switch and connected to said drive housing component and mounted within grasp of said handle housing component; said handle housing component defining a handle housing space in communication with said subcompartment, said at least one battery being positionable in said handle housing space extending into said subcompartment, said switch and said trigger extending downwardly from said drive compartment, said switch being positioned between said trigger and said chuck, said trigger including an L-shaped element mounted for sliding along an exterior portion of said drive housing component and including connection means connected to said switch for actuating said switch upon moving said trigger in the direction of said subcompartment from a rest position, spaced from said subcompartment.

11. An electrical hand tool, comprising a drive housing component defining a drive compartment and a subcompartment, said drive housing component including a front end with a chuck element connected thereto, a motor and a gear box positioned in said drive compartment and a switch positioned in said drive compartment in a downwardly extending portion of said drive compartment, said subcompartment being provided at a rear end of said drive housing component, said drive compartment being positioned between said subcompartment and said chuck; a trigger element positioned in a trigger space between said subcompartment and said downwardly extending portion of said drive compartment, said trigger element being connected to said switch for movement of said trigger in a region between said switch and said subcompartment; a handle housing component connected to said subcompartment and extending downwardly from said subcompartment, said drive housing component and said handle housing component having longitudinal axes which are fixed with respect to one another at an angle, said handle housing component cooperating with said subcompartment to define a battery space extending from a lower portion of said handle housing component to an upper side of said drive housing component.

12. An electrical hand tool according to claim 11, wherein said trigger is positioned in said trigger space connected to said drive housing component for sliding along a lower exterior of said drive housing component in said trigger space and including an actuation surface movable between a position spaced from said subcompartment to a position adjacent said subcompartment.

13. An electrical hand tool according to claim 12, wherein said trigger engages a swiveling angle plate of said switch and activates said switch upon movement of said trigger in the direction of said subcompartment.

14. An electrical hand tool according to claim 13, wherein said trigger is L-shaped and engages said swiveling plate in an upper forward location of said trigger region.

* * * * *